US006489997B1

United States Patent
Stapleton

(10) Patent No.: US 6,489,997 B1
(45) Date of Patent: Dec. 3, 2002

(54) VERSATILE VIDEO TRANSFORMATION DEVICE

(76) Inventor: John J. Stapleton, 6 Caldwell Ct., East Brunswick, NJ (US) 08816

(*) Notice: Subject to any disclaimer, the term of this patent is extended or adjusted under 35 U.S.C. 154(b) by 44 days.

(21) Appl. No.: 09/638,928

(22) Filed: Aug. 15, 2000

Related U.S. Application Data

(63) Continuation of application No. 09/069,438, filed on Apr. 29, 1998, now Pat. No. 6,124,893.

(51) Int. Cl.[7] .................................................. H04N 7/01
(52) U.S. Cl. ..................... 348/441; 348/445; 348/458; 348/556; 348/446
(58) Field of Search ................................. 348/441, 448, 348/446, 445, 458, 459, 443, 556, 555, 451, 452, 913; H04N 7/01

(56) References Cited

U.S. PATENT DOCUMENTS

| | | | | |
|---|---|---|---|---|
| 4,361,785 A | * | 11/1982 | Stapleton ..................... | 315/389 |
| 4,551,753 A | * | 11/1985 | Nishizawa et al. ......... | 348/446 |
| 4,953,025 A | * | 8/1990 | Saitoh et al. ............... | 348/445 |
| 4,989,090 A | * | 1/1991 | Campbell et al. ........... | 348/451 |
| 5,257,102 A | * | 10/1993 | Wilkinson .................. | 348/441 |
| 5,485,280 A | * | 1/1996 | Fujinami et al. ............ | 358/335 |
| 5,517,247 A | * | 5/1996 | Correa et al. ............... | 348/448 |
| 5,537,483 A | * | 7/1996 | Stapleton et al. ........... | 382/309 |
| 5,793,435 A | * | 8/1998 | Ward et al. ................. | 348/448 |
| 5,920,354 A | * | 7/1999 | Fedele ........................ | 348/446 |
| 6,108,041 A | * | 8/2000 | Faroudja et al. ............ | 348/446 |
| 6,204,884 B1 | * | 3/2001 | Lee ............................. | 348/555 |
| 6,256,045 B1 | * | 7/2001 | Bae et al. .................... | 348/445 |

* cited by examiner

Primary Examiner—John Miller
Assistant Examiner—Jean W. Désir
(74) Attorney, Agent, or Firm—Gottlieb, Rackman & Reisman, P.C.

(57) ABSTRACT

A versatile video transformation device and adaptive image processing methodology thereof to digitally scan convert, that is, reformat TV raster scan video and particularly high definition (HD) and/or digital DTV (particularly those for example in 1920×1080i or 1280×720p format) video data and associated synchronizing signals, for the purpose of making present standard television sets compatible at low cost with the latest advancements in free HD whilst allowing a multitude of other DTV programs and ancillary data to fill to a greater extent the remaining channel allocations by FCC to TV broadcasters.

11 Claims, 8 Drawing Sheets

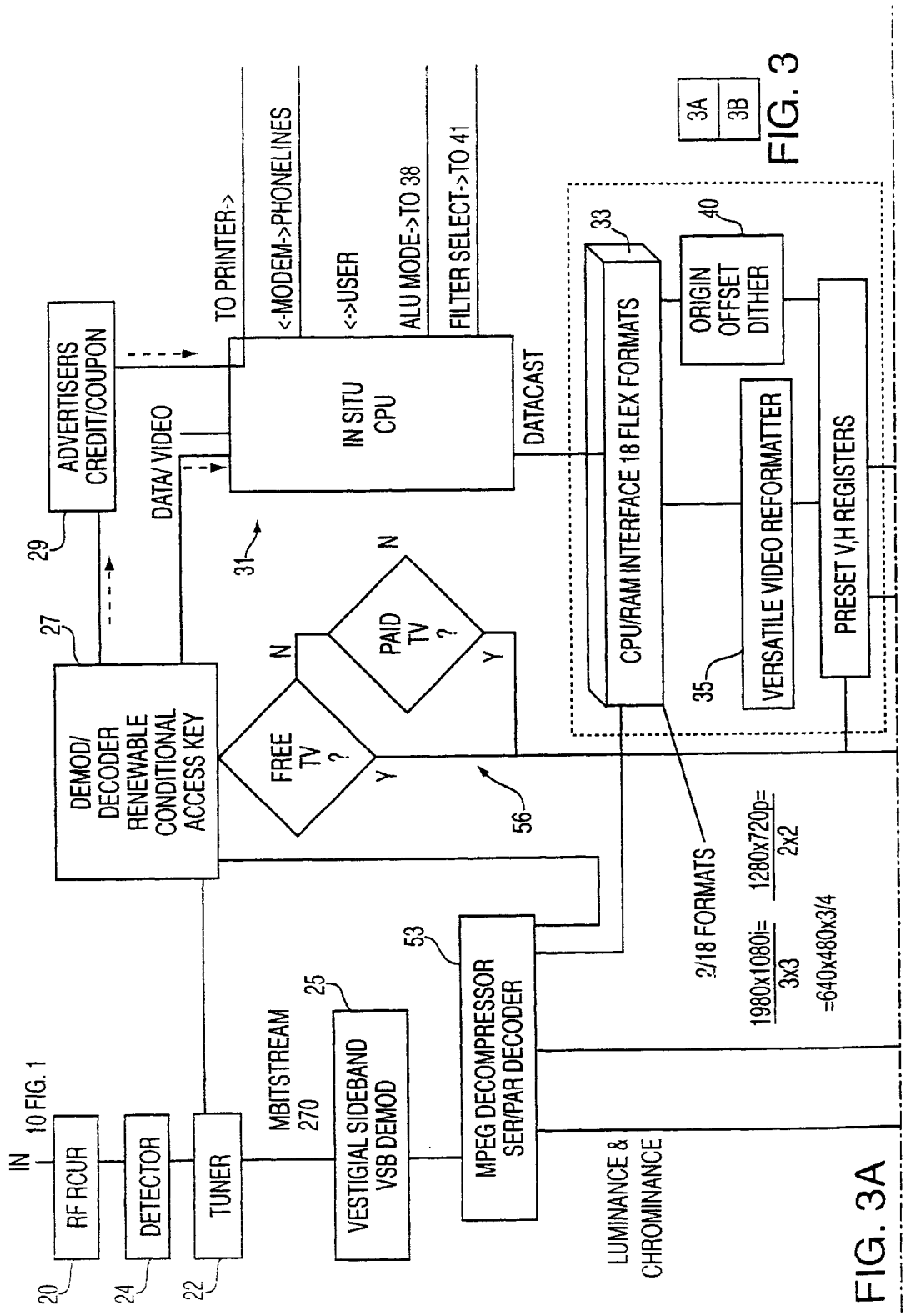

VERSATILE VIDEO TRANSFORMATION DEVICE

This application is a continuation of Ser. No. 09/069,438 filed on Apr. 29, 1998, now U.S. Pat. No. 6,124,893.

FIELD OF THE INVENTION

The present invention is directed towards versatile video transformation device and adaptive image processing methodology thereof to digitally scan convert, that is, reformat TV raster scan video and particularly high definition (HD) and/or digital DTV video data and associated synchronizing signals, for the purpose of making present standard television sets compatible at low cost with the latest advancements in free HD whilst allowing a multitude of other DTV programs and ancillary data to fill to a greater extent the remaining channel allocations by FCC to TV broadcasters.

BACKGROUND OF THE INVENTION

Present TV sets are not capable of using HDTV, but rather are limited to a fixed-format and are incompatible with different TV raster formats such as that provided by HDTV. While an amount of versatility (and energy-efficiency) has been provided by U.S. Pat. No. 4,361,785, the disclosure of which is incorporated herein, it is desirable to improve and expand it, particularly, with regard to standard TV sets.

The inexpensive utility of versatility for single frequency standard TV is especially desirable now because of the availability of HDTV and DTV.

In the past, when color TV broadcasts became available, existing monochrome "black & white" TV sets, at the time, could not display the added dimension of color. Viewers could, however, still see in monochrome sets new programs broadcast in color because the novel chrominance signals conveying the hue and saturation (color purity) attributes were rationalized and compressed into the then existing video bandwidth without substantial interaction with the luminance. While the present invention is not directed towards improving the TV set circuitry per se, in so far as DTV system eliminates many visual impairments eg. interline flicker, sync jitter, moire, raster line structure, multipath ghosts, chrominace distortions etc. the picture quality of such TV sets should be markedly improved. This will be accomplished while, most importantly, addressing the broadcaster's desire to allocate, as much as possible, other programs and data communications within the channel assigned to it by the FCC.

In this regard, the FCC has allocated the traditional broadcasters a new channel for DTV which can include "multicasting" several simultaneous programs with conditional access for a nominal fee that would offset the costs of new equipment needed to broadcast DTV and free HDTV and also provide better competition with costly cable TV and satellite TV.

Ironically, the effective expansion of TV channel bandwidth capacity wrought by removal of redundancy in video compression techniques for HDTV appears directed towards the of viewers' desire to receive more channels due to the quality of programming, or lack thereof. The improved quality of higher resolution pictures—that are not really discernible at present distance between set and viewer, is desirable and possibly only equally important to the viewer than the ability to receive additional channels. Accordingly, it appears that a need exists to provide a higher quality picture as that now made available by HDTV while allowing the broadcaster to utilize to the greater extent, the remaining portion of the channel allocation for additional programming or "data casting".

As to the first objective, which, if addressed properly, allows the second objective to be met, the history of TV evolution reveals the perennial problems needing solution to meet the resolution revolution that now requires brighter, smarter picture processing to live up to HDTV promises of 35 mm quality.

Naturally, the periphery of the picture is blurred by TV cameras that pan, tilt and track to keep in the center of TV moving images that are center of attraction such as an ice skater or player with the football, basketball, puck etc. From empirical human factors data obtained from TV trackers and "moving window" scan converters (Rand Corp., RCA Corp., Fairchild Camera et al.) a target should move through the standard TV field of view in 4 seconds or more but definitely no faster than one second. One second equals time for refreshing 60 fields and also 3.4 fixations of 5×5 degrees at 0.3 second assuming 480 scan lines each subtend arc minute defined as 20/20 vision.

Thus those conclusions that an object ought not to move more than 1-to-4 scan line in ⅙₀th second field is consistent with video compression ratios of 30–120 since 1.7%–0.42% or less is changed in either or both axes.

The prior art of monochrome video scan conversion was considered to be a linear system using analog and later digital means with predictable performance. One of the earliest scan converters involved a TV camera scanning a radar PPI plan position indictor whereby the video values at "rho-theta" (range and angle) polar coordinates driving an oscilloscope display with long persistence phosphor were transformed to the x,y Cartesian coordinates of the horizontal and vertical deflection in TV camera feeding a synchronized TV display. It and subsequent scan converters also used to convert diagnostic ultrasound and sonar signals to TV images mechanized the coordinate transformation matrix called the Jacobian in Calculus texts.

Generally, when higher resolution ultrasound or radar indicators or TV rasters eg. 1225 lines EIA-RS-343 are scan converted to standard 525 lines EIA-RS-170, 330 severe Moire patterns form by the beat-frequency between the horizontal line frequencies if the readout beam was not sufficiently defocussed to span several input scan lines. Preferably an anti-Moire digital filter or dither analogous to analog "wobble" signal can modulate the scan converter input PPI deflection as a function of rho, theta to widen the spokes as it were near the rim when nearly parallel to horizontal scan lines readout.

A patent in the early 1970's granted to Don Dudley of Dataplex Inc. explained how 1225 line HDTV could be broadcast in place of redundant fields via standard 525 line TV. In principle, that is what HDTV does today in transmitting the differences between fields with more robust algorithms for removal of redundancy subject to acceptable rates of distortion and the empirical 70% Kell factor or actually 2/pi=64% modulation transfer function (MTF) at Nyquist sample limit.

Another early scan converter involved the simplistic reduction of 625 TV lines 25 frames/second in Europe to 525 TV lines 30 frames/second in USA by cropping off 100 lines, including at times the forehead of the televised person. Subsequently, instead of cropping 50 lines from the top and bottom, 4 of every 25 lines were dropped out or "decimated" since 625/525=25/21. Preferably, as DTV FSC demonstrated in 1985, for each and every one of 21 readout lines falling between 2 of 25 lines weighting factors proportional to their separations enabled the interpolation of video values between the 625 lines and smoother decimation to 525 than simplistic drop outs. Likewise for example, 720p*2/3= 1080i*4/9=480.

In addition to spatial artifacts of aliasing from subsampling and of contouring from quantization in digital scan conversion, the different frame rates created temporal problems with moving images analogous to the stroboscopic effect of backward wagon wheels in sampling 25–30 frames/second. The modern solution by Silicon Graphics et al. is known as "morphing" is disadvantageous since its temporal interpolation/decimation between fields would require brute-force RAM or excessive software "bloatware" for MPEG-2 decoding.

Before digital random access memories (RAM) became inexpensive and commonplace, instead of a TV camera tube scanning one CRT picture and driving another CRT, Texas Instruments, Tektronix, Hughes Image Devices and other companies produced scan converter tubes with electronic input (write) and output (read) video whose associated horizontal and vertical deflection coils were independent in so called "double-ended" tubes simultaneous read and write. They were time-shared in cheaper "single-ended" tubes as in RAM. Most of these CRT scan converters were eventually replaced by digital image processors or TV "frame grabbers" using RAM in a "brute-force" manner because of the Nyquist sampling limit since RAM was so inexpensive.

Just as the Taylor Series representation in the time domain of the video signal by summation of its time derivatives is the mathematical basis for interpolation or reading video values between the scan lines so also the Fourier series representation in the frequency domain by summation of harmonics of complex sinusoids is the basis of video compression in terms of DCT Discrete Cosine Transform that is the real part of the Fourier Transform. Accordingly, the video transformation may be mechanized in either the time domain as in all known scan converters or in the frequency domain as will be discussed.

While in the past various approaches addressed changes in broadcasting formats and changes in the industry, presently what has not been addressed successfully is the ability to provide for enhanced quality TV resolution as provided for by HDTV and DTV in conventional TV while reserving as much as possible or desired of the remainder of the channel allocation for other programming and/or ancillary data. This is something that is desired by both the viewers and the broadcasters.

SUMMARY OF THE INVENTION

It is an object of the present invention to provide the fullest fidelity, video data integrity of HDTV within the constraints of standard TV sets which is cost effective.

It is a further object to provide externally image quality enhancements eg. "sparkle" of broadcast formats for HDTV so as to optimize the flicker-free field of view or sparkling clarity of TV and provide for full view of the uncropped HDTV picture or full use of-present TV screen.

It is also an object to provide buffer storage for refreshing of compressed images and for video transformation without having to decode and again compress and re-encode the HDTV. In this regard, briefly, the present invention provides scan conversion in the frequency domain using the equivalent Fast Fourier Transforms (FFT) of time scaling, shifting and of video derivatives for interpolation/decimation because N nodes are efficiently reduced from N×N operations to N×Ln(N) and because it exploits benefit of compression ratio which is proportional to resolution.

It is a further object to provide without objectionable aliasing or flicker remarkably higher resolution than is ordinarily expected by Nyquist sampling theorem and averaging circuits. In this regard, briefly, the present invention effectively circumvents the luminance blurring and chrominance cross talk at edges due to averaging or due to low pass filters at half the sampling frequency and dithers spatial filter sparkle to smooth flicker.

It is also an object to provide video transformation of DTV noninterlaced, so called progressive scan to standard interlaced raster format and conversely transform interlaced fields to noninterlaced frames for PC monitors and printers.

It is a further object to provide enabling technology and local storage for compact video router transformations to allow and to promote individually addressed video transmissions through quasi cross-point switches connecting any number of video sources to any number of video destinations.

It is a yet further objective of versatility in expandability up to 65K×65K pixels of MPEG so as to provide the sensation of realism.

Lastly, it is the ultimate object of the invention to provide for enhance quality TV resolution as that provided for by HDTV while reserving the remainder of the channel allocation for additional programs and ancillary computer data.

The present invention provides for the foregoing objectives by providing for a means to receive, decode and scan convert 1920×1080i or 1280×720p HDTV or other DTV format on standard TV sets while substantially enhancing display thereof. It provides for sampling and filtering of the higher definition TV images for scan conversion without typical crosscoupling of chrominace and luminance so as to sparkle on lower resolution TV sets while substantially maintaining the input detail subject to viewers complex spatial/temporal flicker tolerance. It does this by a dithering of raster origin offsets in zigzag fashion within 3×3 or 2×2 array of pixels for scan conversion into one pixel readout. This allows for an HDTV quality picture to be broadcasted on a format having a reduced bandwidth so as to allow the broadcaster to have a greater portion of the remaining channel for other programming whilst allowing a standard TV to utilize the HDTV or DTV format broadcasted.

The present invention also provides for renewable conditional access to demultiplex multicast programs and ancillary data compressed in packets within one DTV channel allocation. It enables standard TV sets to become compatible with DTV, HDTV and flexible formats of PC monitors and hard copy printers.

Moreover, its electronics may be incorporated within newer TV sets to minimize redundancy of hardware and its electronics may be incorporated within a integrated circuit chip.

BRIEF DESCRIPTION OF THE DRAWINGS

Thus by the present invention its objects and advantages will be realized, the description of which should be taken in conjunction with the drawings wherein.

The finer HDTV "virtual screen" as it were behind the coarse TV screen illustrates how the comparable 1920×1080i or 1280×720p actually "SPARKLE" using zig-zag ordered raster dither of origin offset to exploit the space-time bandwidth of viewers eye-brain.

Note the well established fixate rate of 300×300 arc minutes/300 milliseconds integrates 18 progressive frames vs 9 1080i frames. Thus the progressive HD's radical-2 improvement makes the perceived resolution and signal/noise nearly identical for 720p=1080i.

Figure 2A:
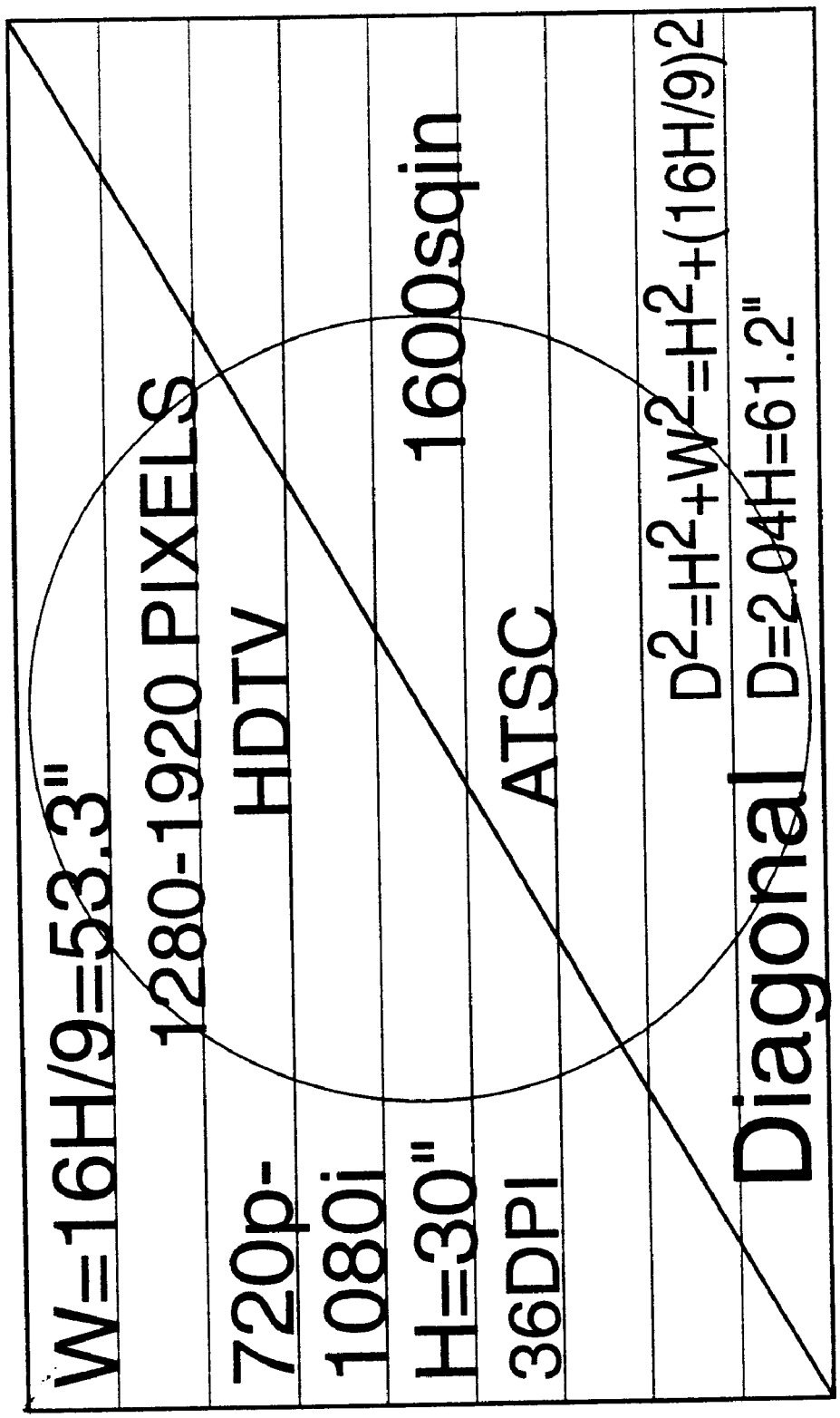

FIG. 2 illustrates a comparison of raster formats allowing interlace 1920×1080i thru 3×3 filters or progressive 1280×720p thru 2×2 filters plus Multicasting of 4 other ancillary TV data or scrolled datacasting which fit conveniently in the bottom (or top) 25% otherwise blanked because the HDTV 16/9 aspect is 25% shorter than standard TV height.

Figure 3B:
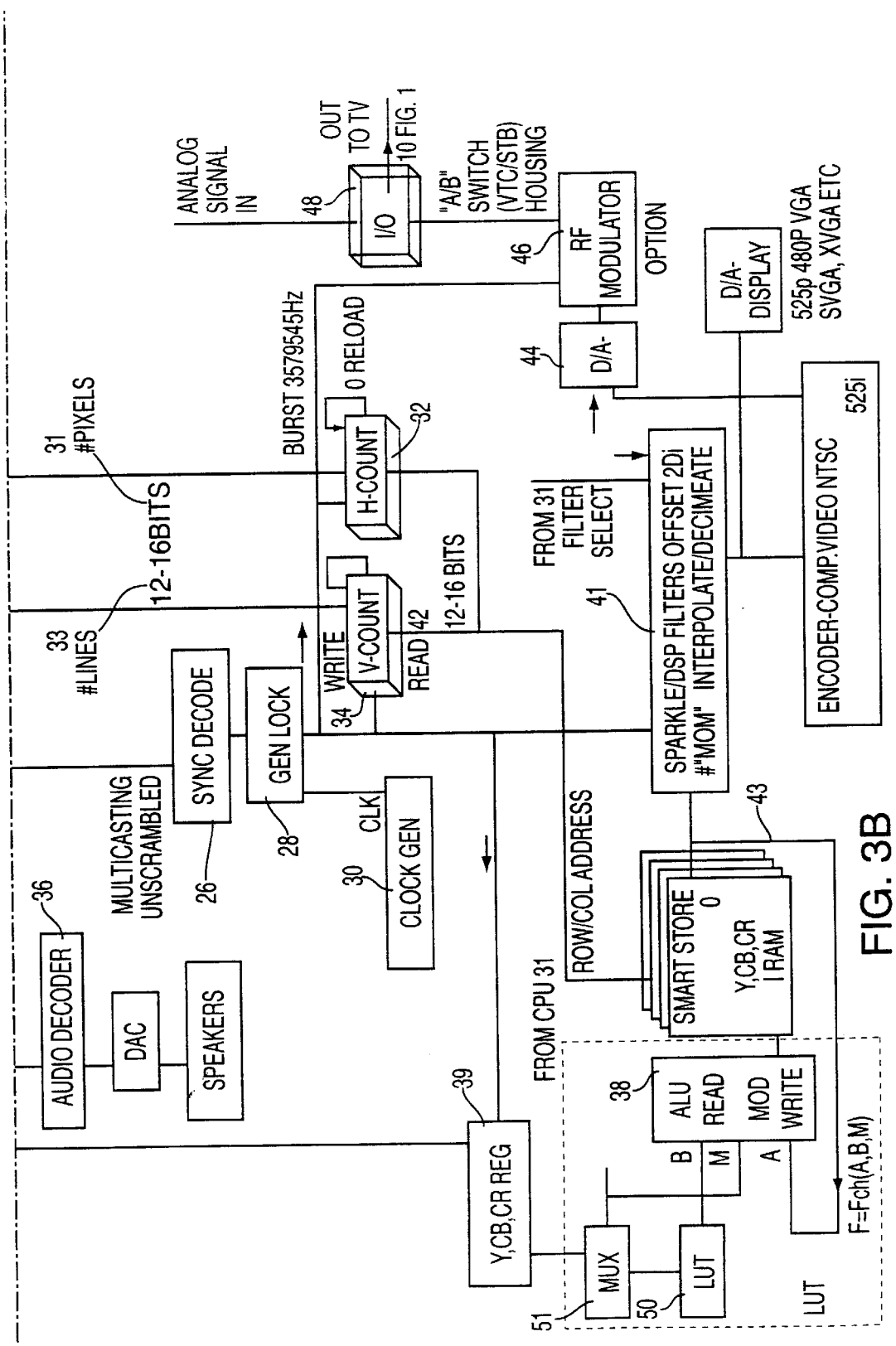

FIG. 3 is a detailed functional block diagram of the versatile video transformation including an in situ CPU, renewable conditional access key, advertisers credit/coupons and by way of example the 2×2 and 3×3 operations on 1280×720p and 1920×1080i HDTV which are two of the most likely of the 18 flexible formats of DTV processed by the VVTD.

Figure 1:
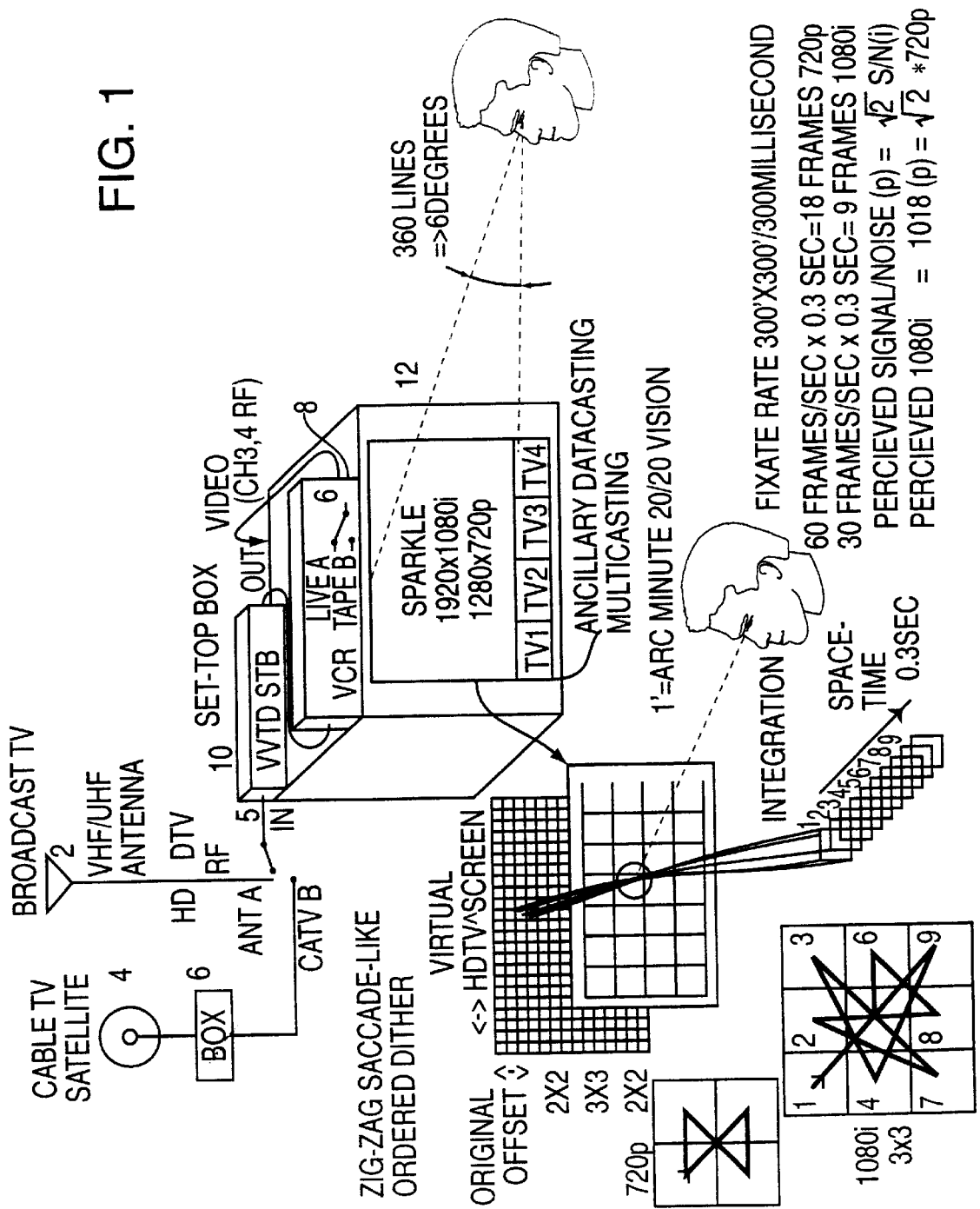
FIG. 1 is a general block diagram of the present invention showing conventional "A/B" switch between Satellite or CABLE TV & FREE TV ANTENNA feeding into VVTD STB (set-top-box) which feeds the TV via optional VCR, not yet digital or high definition.
Figure 4:
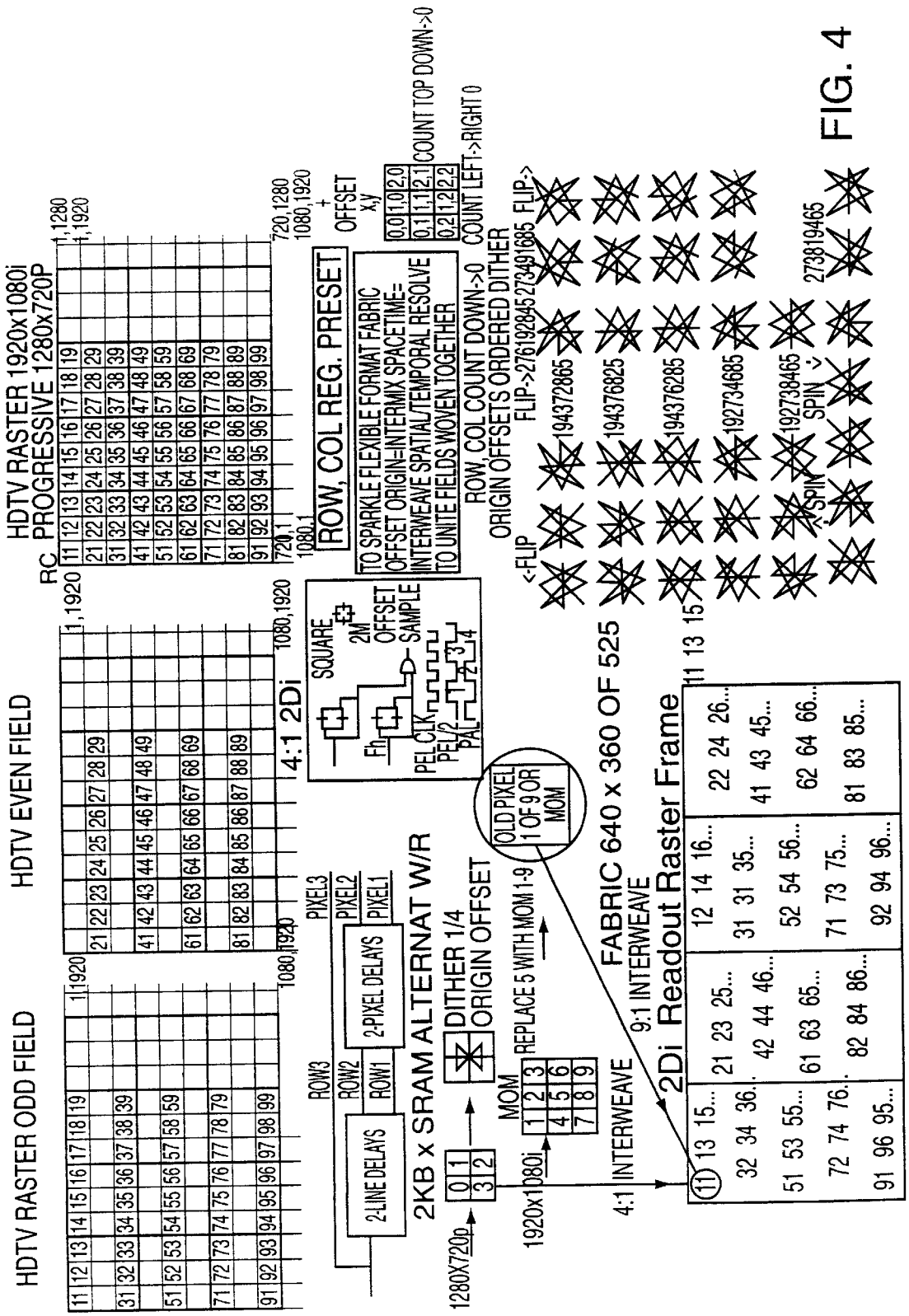

FIG. 4 is a functional diagram of block 41 of FIG. 1 illustrating the origin offsets of ordered raster dither providing the SPARKLE feature of the present invention for the two most likely HDTV rasters, 720p and 1080i. It also presents a graphic representation of the 2 dimensional dot-interlace (2Di) readout raster frame of 640×480 particularly for TVs and VCR's with about half the 6 MHz bandwidth for VGA. A radical-2 improvement in 2Di effective resolution results on axis from the phase alternated 11.93 MHz offset sample clock.

Figure 5A:
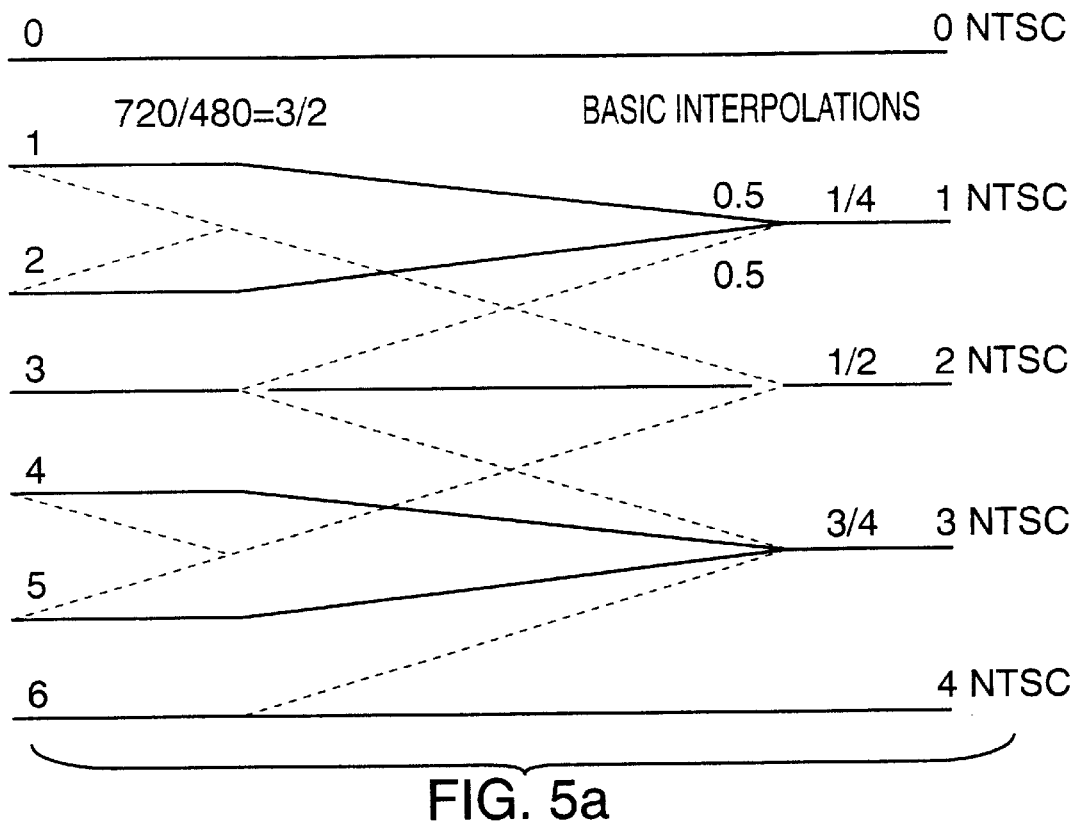
Figure 5B:
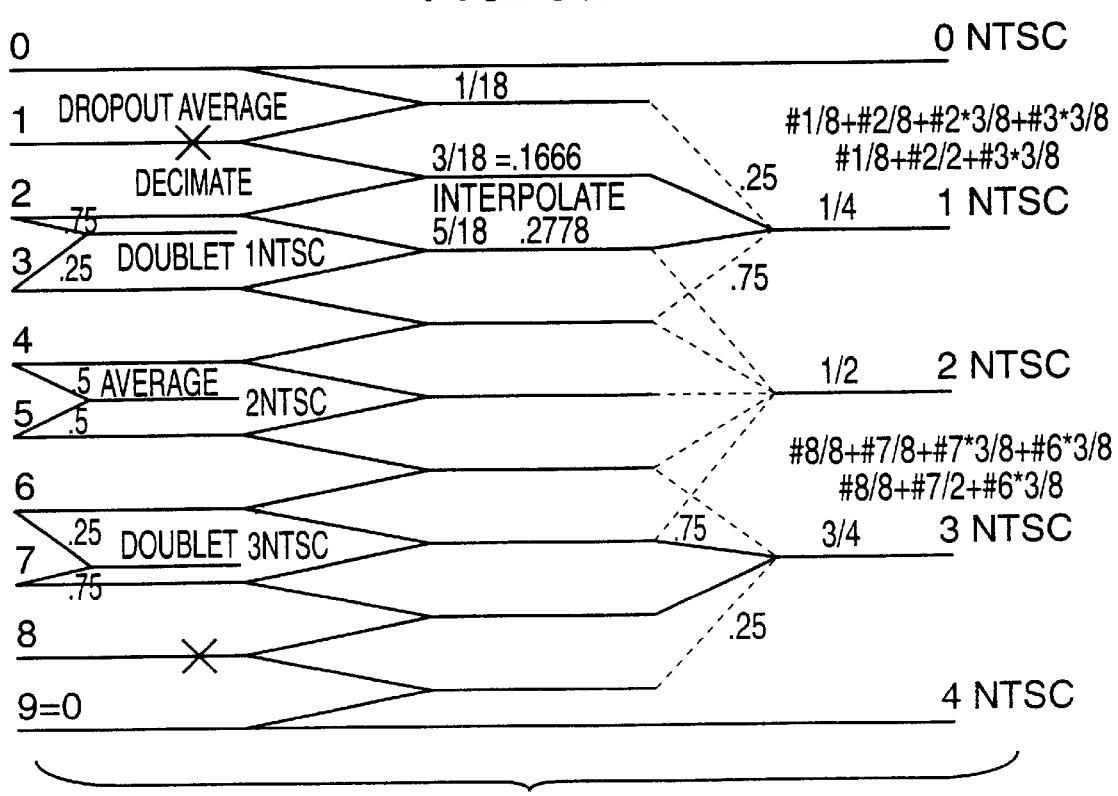

FIG. 5 illustrates by simple example of interpolation and decimation of the present invention of HDTV 720p lines by 2/3 and also 1080i lines by 4/9 to 480 lines when the viewer chooses to fill the full height of the TV with HDTV, knowing 25% of the HD picture width is necessarily cropped off since the 16/9 HDTV aspect is 4/3rds wider than standard 4/3 aspect.

DETAILED DESCRIPTION OF THE PREFERRED EMBODIMENTS

Turning now more particularly to the drawings, FIG. 1 shows the general set-top-box of the present invention in this regard. The utility of versatility is especially desireable because of the present lingering debate and uncertain future of 1920×1080 interlaced lines preferred by some TV broadcasters over the comparable 1280×720 progressive scan favored for action sports, multicasting, datacasting and by personal computer companies because of high speed low cost data networking.

The TV input signal may be received from either broadcast antenna 2, from cable TV 4 or satellite which is transformed and output via optional VCR 8 to the TV set 12 preferably as video signal or on channel 3 or 4 RF radio frequency signal (60–66 or 66–72 MHz). A cable TV or satelitte box 6 may be provided and has its own RF tuner so it is also an objective of this "set-top box" 10 to ultimately avoid the expense of a third or fourth tuner in the system and thereby be even lower cost.

The present invention is directed to converting digital and high definition TV to standard TV with fullest fidelity and image integrity desireable in accordance with ergonomic definition for 20/20 vision, i.e. a arc minute of resolution (291 microradian) and also in accordance with economic balancing of broadcasters expensive new equipment by renewable conditional access key and advertisers credit/coupons to offset consumers fee expected to be substantially less than cable TV charges.

HDTV<->Transform all 1280×720p into 640×360 of 525TV
DTV Multicasting and Datacasting of ancillary info
HDTV<->Transform all 1920×1080i into 640×360 of 525
ATSC other 16 formats, progressive & interlace
Full TV Channel Capacity 6 MHz (VGA) 640×480
Radical-2 Resolution 12 MHz 2Di Dot interlace
NTSC full color 4.2 MHz 448×336 (typical TV set)
NTSC full color 3.6 MHz 384×288 (typical VCR)
Monochrome (256 gray levels) also 320×240 dots
Simplest bilevel, black/white TV field 320×240 dots The HDTV "virtual screen" lattice in FIG. 1 vibrates behind the coarse TV screen as it were so that comparable resolutions of 1920×1080i and 1280×720p are squeezed through 3×3 and 2×2 filters as FIG. 4 demonstrates. They "SPARKLE" via zig-zag ordered raster dither of origin offset by exploiting space-time bandwidth of viewers eye-brain. It is important to realize the well established fixate rate of 5×5 degrees per 0.3 second permits 18 progressive frames to be integrated at 60 Hz vs 9 interlace frames at 30 Hz and thus progressive HD's radical-2 improvement makes the perceived resolution and signal/noise comparable, not to mention less motion artifacts with 720p and the ancillary datacasting and multicasting of several programs.

Therefore the crisper, wider visual impact of FCC, ANSI/SMPTE, CCIR, ASTC, ISO, IEC specification or 1280×720p and 1920×1080i picture elements when viewed where just resolveable suggests that HDTV screens must be viewed from ½–1/3rd the present average distance or else be at least 2–3 times as high as standard (NTSC) TV picture tubes. DTV's reduced transmission impairments lets viewers come closer and its subnanosecond sync jitter eliminates interline flicker as a precondition for SPARKLE function. The effective vibration or pseudo random dithering of the high defintion "virtual screen" seen through the lower resolution TV screen apertures is further discussed below.

Figure 2B:
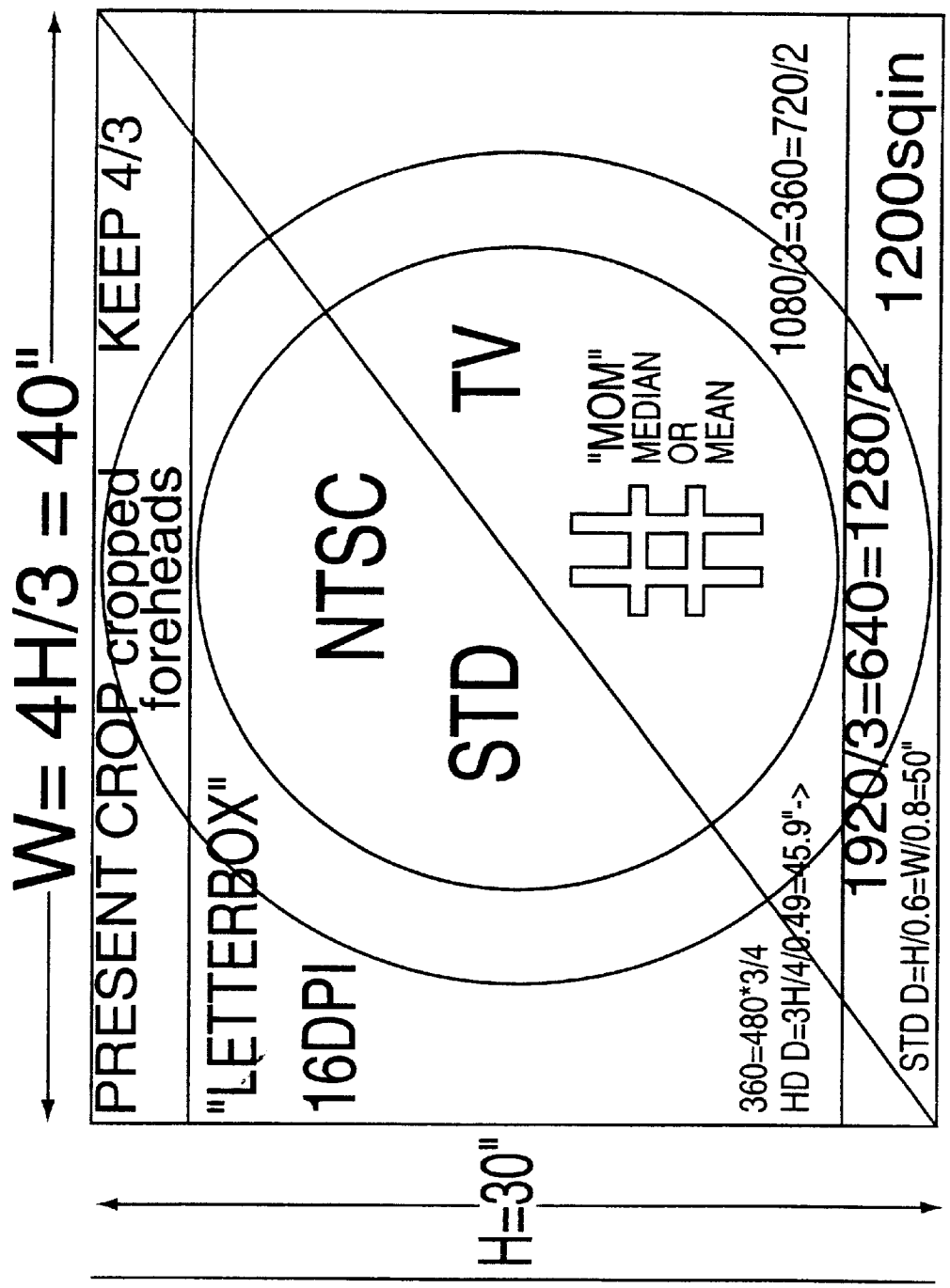

A comparison of raster formats is set forth in FIG. 2. In this regard the upper raster format 2A shows the proposed raster format for HDTV 192×1080i and 1280×720p illustrated for example on a 30 inch high screen having a width which is 16/9 times the height and 33% wider than a standard TV set of equal height which is illustrated in FIG. 2B.

FIG. 2B shows two ways of fitting the HDTV signal into the standard size, by either cropping the HDTV width or blanking 25% of standard TV picture height. However cropping has the disadvantage of losing 25% of the picture and shrinking wastes 25% of the 480 standard raster lines or height.

At the same viewing distance, the most noticeable difference between the new TV & old is the wider HDTV screen, which is 16/9 times the height or 4/3 times the old NTSC width which is 4/3 times the same height, whether 1080 lines or 480 lines. As illustrated in FIG. 2B instead of dropping out 5 of every 9 HDTV lines per frame, the present invention interpolation and decimation into 4 NTSC lines interlaced between the 9 HDTV of 2 fields is smoother and preferred if motion is not sensed and full standard height is used.

In this regard and for purposes of comparison and by way of example, for H=100 units (cm), old width is 133.33 and new width overscans to 177.77. Hence ⅛th would be cropped off each side; only 1440 dots are displayed of the 1920 unblanked HDTV dots and 8/15 times the 1440 compresses to 768 dots/width with dot clock 4 times the NTSC color subcarrier 3579545 Hz. Conversely the full NTSC could be viewed within ¾ths of the HDTV width provided the 480 NTSC lines are interpolated and expanded by 9/4 to 1080 and the 768 NTSC dots are interpolated and expanded by 15/8. Simple doubling of NTSC lines and dots is cheaper but repeat line adds absolutely no new information.

Figure 2C:
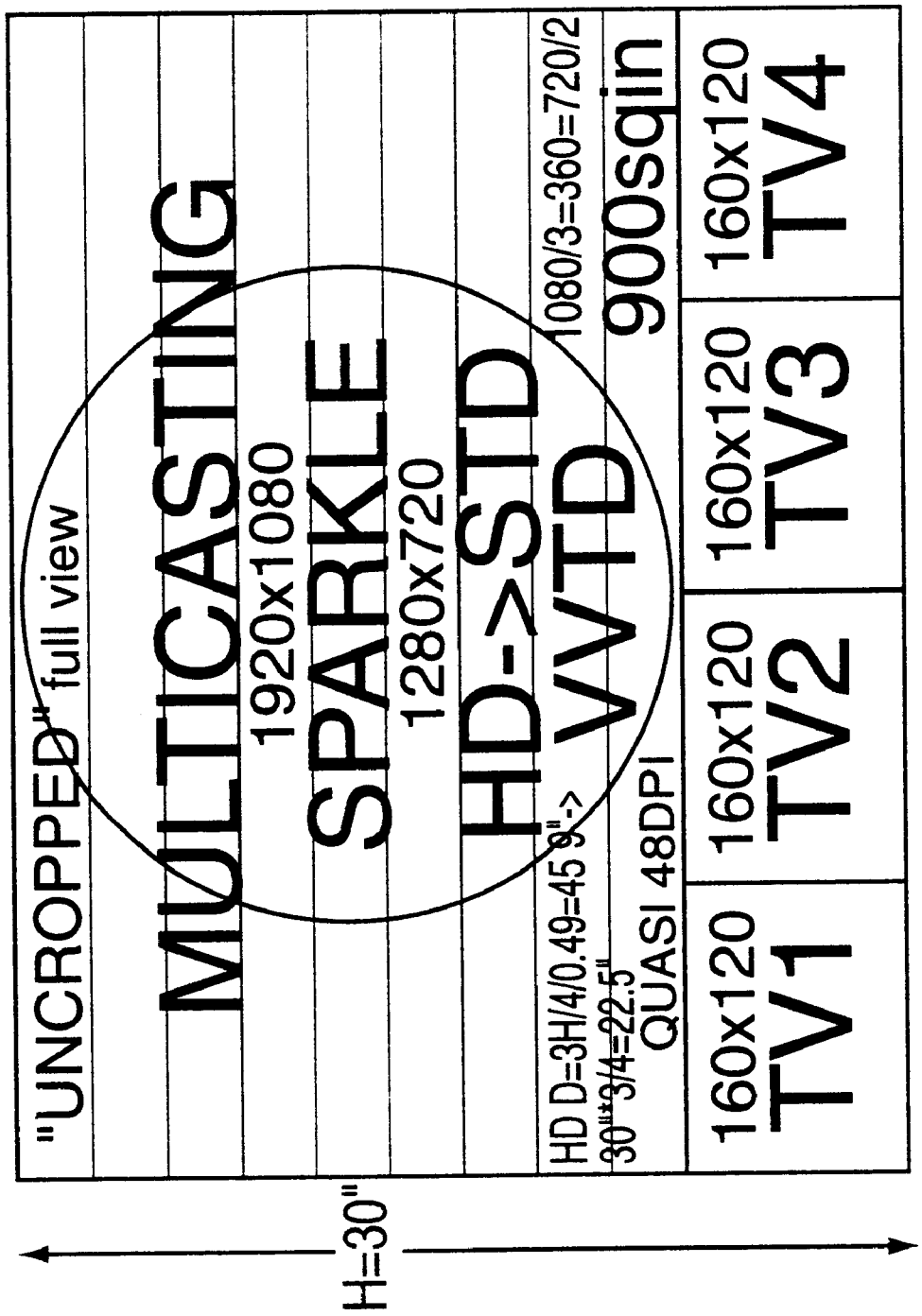

Shown separately in FIG. 2C, the full screen of HDTV is augmented by "Multicasting"/"Datacasting" which fits into the otherwise 120 blanked lines and offers distinct advantages over 1080i producing the same perceived resolution. Almost 25% of the 720p transmission is specificied to transmit ancilliary data which rate is comparable to 1.5 MHz T-1 phone lines being about 25 times faster than 56 Kb/s modems. As shown in FIG. 2B to squeeze the entire HDTV 16/9 frame into the NTSC 4/3 aspect ratio then ⅛th of the NTSC screen is typically blank on top and bottom. The 360 lines must somehow display 720p and 1080i. There are many 2×2 and 3×3 spatial filters well known in the art to do this.

A 3×3 median filter compresses 1080i/3 to 360 and 1920/3 to 640. The median value of 3×3 arrays of dots typically replaces the center pixel and does not blur edges as a running average smoothing filter does. In this case however the median filter replaces all 9 pixels as seen in the readout raster as one pixel for one field. In the next field the 3×3 window center shifts as much as the origin offset so a new median value replaces the newer set of 9 pixels as one readout and so on. The ordered dither thereby lets the eye-brain do the "error diffusion" keeping the chrominance and luminance in tact, as opposed to averaging and interpolation filters.

Alternatively for some images, to smooth contouring or perception of quantizing noise the center of the 3×3 can be replaced advantageously by the average of the 8 nearest neighbors and be represented as one readout pixel. The subtraction of such a low pass averaging filter produces a so called "Laplacian filter" that enhances edges upto a point of objectionable noise. Because that is in morphic resonance with a similar Laplacian filter deduced to be in the visual cortex, (which overshoots perfect steps of gray) the analogous effect of high pass edges and/or low pass averaging can be obtained in the eye-brain itself by selectively representing one and only one of 9 pixels in each 3×3 array in each field. Considering all sequences of 9 pixels, FIG. 4 zig-zag patterns show how jumping maximum distances accomplish error diffusion, whether a median, or mean or single pixel is representative of the 3×3 depending on the picture content and subjective quality. Hence the versatile video is also made adaptive to the distribution of spatial frequencies contained in the MPEG coded data by the Filter Select signal from the CPU 31.

With NTSC full standard 4.2 MHz video the resolution is only 448×336 even though about 480 scan lines are unblanked. The present inventions serves to overcome such limitations as will be discussed more fully. To further enhance perceived resolution, a radical-2 or 41.4% boost by 2D dot interlace is possible by offset sampling by 12 MHz clock phase alternate lines (PAL) as shown in the lower center of FIG. 4. As Dean Wendland of University of Dortmund demonstrated, the square Fourier (frequency) spectra is effectively rotated to a diamond so resolution on axis is improved by radical-2.

Notwithstanding the foregoing TV set limitations, the DTV transmission and present invention scan converts similar 1280×720p and 1920×1080i by exploiting the space-time bandwidth in the visual perception of the viewer. Furthermore, because of the video compression of DTV transmissions several programs can be compressed with the allocated channel in addition to or instead of the HDTV format. The advantage provided by the present invention is the feature of allowing the HDTV signal to be compressed while maintaining the free broadcast quality of the picture and also allowing renewable conditional access to the multiple broadcasts compressed into each channel. A nominal user fee would offset broadcast expenses and be compensated by TV advertisers coupons or credit 29.

Turning now to the VVTD shown in FIG. 3, a functional detailed block diagram is shown for the set top box 10 of FIG. 1. In this regard the TV signal may be from broadcast antenna 2, from cable TV 4 or satellite which usually output via VCR 8 to the TV set 12 a Channel 3 or 4 RF radio frequency signal (60–66 or 66–72 MHz) or video signal unlimited by the tuner. However since DTV and HDTV VCR are not yet available the VVTD video or RF output feeds into the VCR to be taped or displayed live on the TV screen. Note the satellite or cable TV box 6 also has its own RF tuner so it is an advantage of the "set-top-box" device 10 to avoid the expense of a third or fourth tuner in the system and thereby be low cost.

The Channel 3 or 4 RF receiver amplifier signal 20 is detected by 24 and tuned to a selected channel frequency 22 from which the video signal is demodulated in 25 and 27 and sync is decoded in 26. The synchronization data signals for the GEN LOCK circuit 28 which is phase locked to the crystal controlled CLOCK GENERATOR 30 for both writing and reading the RAM video content. This clocks the Write and Read H-Count 32 which are preset by respective H-sync and likewise the V-Count 34 is preset by the V-sync as determined by the CPU/RAM Interface 33 and Versatile Video Reformatter 35. The Origin Offset 40 to dither the raster will become clear later on. Basically the RAM rows and columns are addressed by counting down from preset values until zero reloads the appropriate preset. To save RAM, the HDTV can be converted going into it, so only 640×480 pixels need to be stored. However the full HDTV picture can be inexpensively captured in RAM so that it can be selectively readout through the adaptive spatial filtering to preserve as much fidelty as possible.

The digitized Luminance (Y) and color difference signals (Cb, Cr) are latched in register 39. They are processed with the RAM Read-Mod-Write signal thru the ALU 38 arithmetic logic unit as a function of modes from CPU 31 and the prior (A) and present (B) values. The RAM 43 is sequenced thru the addresses of the pixel (H) 32 and line (V) counters 34 offset each field +/−1 or 0 by 40 RAM output also feeds the Sparkle/DSP filters 41 which consists of pixel and line delays to provide at once all video values of each instant pixel and its neighbors. Lookup table (LUT) 50, preloaded through Multiplexor 51 from CPU 31, converts the new DTV luminance and chrominance to standard TV values to be generated for the purpose of optimizing the adjustment of the TV brightness, contrast, color sharpness and tint. This ALU operation can be performed for example by Texas Instruments 74181 or else the same LUT 50 could also incorporate all the ALU functions, including for example transformation to RGB, Y, I, Q, HSI Hue, Saturation, Intensity for displays other than the TV set. The RAM output is filtered by 41 whose functional mechnanization is shown in FIG. 4.

The digital video output from the RAM 43 is refreshed at 60 Hz field rate and the digital to analog converter 44 feeds it to the RF modulator 46 which mixes the chroma burst and sync signal before going out to the TV set thru the Input Output I/O RF switch 48. Note in the case of an analog TV signal coming in, the I/O switch allows it to be fed directly into the TV set. This may be done automatically or by way of a manual switching device if the user knows which signal is being transmitted. The switch may be an A/B switch in which the entire set-top-box electronics integrated Into one Versatile Video Transformation Chip (VTC) might ultimately be housed.

In addition the DTV data/Not-video, from the Demod/Decoder 27, which enables renewable conditional access key, is fed to the CPU 31. This ancilliary data such as defined in ANSI/SMPTE 296M-1997 for 1280×720p offers almost the same channel capacity as dedicated 1.5 MHz phonelines because 25% of the 6 MHz DTV spectrum is not picture content. The datacasting affords high speed, low cost downloading of information to the CPU and displays or user output devices besides the printer and modem shown connected to CPU 31. In addition, with the proper key decoded, unscrambled multicasting of low cost TV programs offers competitive advantages between free TV and rising cable prices. It is estimated that economies of scale to convert DTV for a massive market of 1.15 billion TV sets, even remaining about the homes with new HDTV sets, should enable the VVTD to be so affordable initially that it will encourage the buyers willingness to pay for the VVTD. In addition to the free portion of the allocated channel, the remaining portion which will be expanded due to the present invention allowing the broadcaster to use a format having a reduced bandwidth whilst maintaining an effect of HDTV quality, may be dedicated to subscription or pay programming. In such a case, the decoder can discriminate (see i.e. decision boxes 56) between such programming and whether a user is a subscriber, much the same as cable or satellite user systems work.

In addition, production of standard sets will not stop immediately so they could incorporate the VVTD inside instead of duplicating much of the set-top-box electronics.

Returning now to the methodology involved, conversion of 1920×1080i HDTV to fit properly within 360 lines of VGA 640×480 may be better understood by considering the VVTD picture "fabric" and 3×3 median or mean (MOM) within Sparkle filter 41. Narenda in IEEE article had shown advantages of speed and circuit simplicity in finding the median of the median and he also pointed out how it differs from the true median and mean filters. The video mean, median, mode and peak-to-peak average are specifically different electronic video parameters but somewhat the same in,unskewed statistics.

For example the mean video value replacing the center of a 3×3 # array is called the Laplacian operator that is employed in electronic imaging for edge enhancement as reportedly in the visual cortex. The mean yields the least "mean square error" that is generally preferred because it is "tractable" i.e. easy to manipulate but the human eye does not compute mean square error as such. The 3×3 MOM exploits rationale for 1920×1080i because of simplicity of division by 3 and it keeps the integrity of chromaticity with respective luminance.

Because the perceived brightness is a linear response to density (=-Log(Relative Brightness), the average of picture elements finer than arc minute resolution defined as 20/20 vision involves simple, scalar aritmetic. But the combination of HDTV picture elements chromaticity is a more complex, nonlinear vector process wherein mental attributes of hue and saturation (purity) are represented by the vector angle and magnitude respectively. Unlike averaging filters, the median retains proper luminance and chrominance, retains edge sharpness and provides noise smoothing without distortion and without streaking due to extreme excursions of video amplitudes or peak-to-peak average.

Median filters replace the central pixel of a N×N array with the median value of all values in the array. It can be shown that the median yields the least expected absolute error. Its chrominance and luminance exactly equals the middlemost value. More simply, the middle number of an ordered set of samples is the median. N-random samples can be sorted or recorded in hardware histogram as taught in U.S. Pat. No. 5537483. The extreme values do not influence the median as they affect the mean value because the median ,value of an image histogram is the x-abscissa gray point at which the integral of probability density function of x, p(x) is half the total integral for all x. For each random x-value address the RAM increments by one its contents that is cleared after the calculation. For each x value y is the number of times x occurred. Compute y/N=p(x). In 3×3 y>4 gives median x value else add up the CDF cumulative distribution and choose the mean or median to make the picture smoother or sharper. Begin again at x=0 and find the closest x point where the integral of p(x) upto x is the CDF(x) and total CDF/2 x abcissa value is the median. This takes time and power.

Quicker median of median filter replaces the central pixel of a line of pixels with the median value and then computes the median of all medians which replaces the center pixel. The MOM however maintains HD full splendor of 1920× 1080 by replacing every 9 pixels in 3×3 array with the median or mean.

The fabric of new TV frames created by the present invention must be adaptive to 18 flexible-format raster Standards. The picture fabric is optimized by the VVTD so that the high definition pictures SPARKLE on the old TV sets in the full splendor of all 1920×1080 HDTV picture elements (pixels) woven togethery to unite the motionless interlaced (i) fields or to alternate the raster lines of the "progressive" (p) noninterlaced inputs.

The present invention enhances perceived resolution up to 4–9 times the VGA interlaced raster output that is necessarily shortened to 640×360 because the new HDTV aspect ratio reduces the 480 line height 25% from ¾ths of the width to ⁹⁄₁₆ths. In simplest terms, a unique 2×2 or 3×3 array sequence of maximum displacement vectors therein dithers the raster origin offset in saccade-like jerks among the 4–9 pixls luminance (Y) and chrominance (Cb,Cr) represented by one readout pixel.

After MPEG decompression, VVTD DSP filters perform unique 4:1 or 9:1 video compression by scan converting down to 640×360. Another filter replaces the center HDTV pixel of each 3×3 array with the median value instead of averaging or decimating by division by 3 in each axis. In conjunction with the integration in space and time, the 3×3 median of median image filter effectively smooths the higher definition TV without blurring the edges as nearest-neighbor averaging does and without jagged edges from decimated drop-outs and aliasing due to subsampling. Similarly the 2×2 filters convert the 1280×720i.

Since DTV jitter spec is less than a nanosecond, interline flicker from imperfect interlace is imperceptible even upon close viewing such that the degree of SPARKLE selected depends on viewing distance and nonlinear tolerance of complex flicker. Accordingly the CPU 31 sends Filter Select to 41.

The saccade-like zigzag origin offset also provides supersampling of full resolution HDTV picture to be displayed in time and integrated in the eye-brain. The pseudorandom dither sequence is ordered to minimize artifacts i.e. error diffusion and maximize perceived resolution. Impairments due to cross coupling of chrominance and luminance by interpolation and averaging are avoided by the VVTD maintaining the proper chrominance with the median's true luminance value or that of the 4–9 supersamples.

Where TV or VCR does not have direct video input and the RF tuner bandwidth is only about half the 6 MHz full channel bandwidth required for VGA, offset samples interlace fields of 320×180 in 2D into 640×360 of 525 frame and provide a 41% enhancement by effectively rotating the 2D Fourier frequency response square to diamond as shown by Dean Wendland of University of Dortmund. Of course checkerboard pixel pattern becomes gray but that is very rare in real life. Minor flicker results.

The HDTV Raster 1920×1080i interlaced fields is illustrated separately and combined as the progressive 1280×720p frame in FIG. 4 wherein the row, column matrix address (r,c) in RAM corresponds to TV lines and pixel counters. To display HD 4–9 times more pixels on old sets yet minimize visible artifact, the ordered sequences of origin offsets are shown in FIG. 4. Each 2×2 or 3×3 block is thus vibrated or dithered and compressed into one pixel that SPARKLES with 4–9 sequential values or 4–9 medians for 4–9 offsets. Strong pixel to pixel correlation minimizes the 4–9 median differences because mathematically it is the best value that minimizes expected absolute deviations seen by the eyes whereas the average value minimizes mean-square-error which eyes don't compute. Since the median of even number of values is defined as the average of the two middlemost elements, the chrominance distortion discussed below can be avoided in the 2×2 spatial filter for 1280×720p by selecting the exact chrominance and luminance pixel value closest to the median or mean value or the most probable (mode).

The means to accomplish DSP spatial filtering is well known in the art of image processing. All 9 pixels in the 3×3 array must be made available simultaneously so a 2 Kilobyte SRAM is a convenient TV-line delay when it is read out the next line before being rewritten. Two D-latches clocked as a serial shift register of one byte into another forms the pixel delays as shown in FIG. 4. Obviously the 3×3 hardware also provides the subset 2×2 array of pixels simultaneously.

Of course design deficiencies and visual impairments within older TV sets will not be eliminated by the DTV or VVTD and in fact some may become more objectionable to some small fraction of viewers. To make the A/B comparison tests, the VVTD includes a switch 48 of FIG. 3 to select the old or new, i.e. old NTSC or new ATSC HDTV or DTV as previously discussed.

Support for the interpolation/decimation used in 41 of FIG. 3 beyond Nyquist sampling limits can be found in Fogel, L. J., "A Note of the Sampling Theorem," *IRE Trans. Info. Theory Mar.* 1, 1955 p47–48) and valid Taylor Series representation of any signal in terms of its time derivatives or Fourier Series in terms of sinewave frequency harmonics.

With regard to FIG. 5 which is merely two simple examples, the following interpolation/decimation other NTSC line averages the 720p line above and below it. Curve fitting beyond two lines using as much as 9th order Polynomials have been reported. However, because of the disadvantages of interpolation and decimation, the VVTD attempts to employ the simplest filtering that relies on and exploits tuned sensitivities in the visual perception.

Given f' (kT)=df(t)/dt at t=kT, (k=0,1,2, . . . ) the period of time between samples, Ts=1/Fs=<1/Fc. Consider 9→4 lines:

| V0/9 | V1/9 | V2/9 | V3/9 | V4/9 | V5/9 | V6/9 | V7/9 | V8/9 | V9/9 |
|------|------|------|------|------|------|------|------|------|------|
|      | *3/4 | *1/4 | *1/2 | *1/2 | *1/4 | *3/4 |      |      |      |
|      | +    |      | +    |      | +    |      |      |      |      |
| V0/4 | V1/4 |      | V2/4 |      | V3/4 |      |      |      | V4/4 |

Note the V0/9 and V9/9 are the same as V0/4 and V4/4. Since V2/4 is equidistant between V4/9 and V5/9 it is set equal to their average, whereas the V1/4 and V3/4 are interpolated (GEOMTRICALLY weighted) values. Since ¼=0.25 happens to be ¼th up the gap of ⅑th=0.111 . . . between 0.222 . . . and 0.333 . . . it follows $$V(¼)=¾*V(²⁄₉)+¼*V(³⁄₉).$$

Likewise ¾=0.75 happens to be ¾th up the gap between 0.666 . . . and 0.777 . . . such that $$V(¾)=¾*V(⁷⁄₉)+¼*v(⁶⁄₉).$$

Because V1/9 and V8/9 are totally ignored these two dropouts distort the decimated picture elements. By using the differences between all the HD DTV samples and differences between those differences, the 2nd derivatives f" (kT) provide a much more accurate characterization of the signals.

Given f" (kT)=d f(t)/dt at t=kT, Ts<(3/2) (1/Fc). And given m (many) derivatives with m-th derivative being the highest, then Ts=1/Fs=<(1/2) (m+1) (1/Fc).

The above analysis in the time domain is equivalent to Fourier analysis in the frequency domain and the real part of the so called Fast Fourier Transform (FFT) provides the MPEG coefficients of the DCT Discrete Cosine Transform in 53 of FIG. 3 used in DTV compression. They characterize and reconstruct video signals into 8×8 blocks, much of which may be zeroed to minimize redundancy subject to acceptable level of distortion. In general any series of video elements can be represented mathematically by a polynomial curve that can fit the video oscilloscope waveform as precisely or practical as desired. For example f' (kT) gives straight line approximation, f" (kT) fits a parabolic shape, f'" (kT) fits any cubic spline etc.

To the extent adjacent pixels are said to be correlated they can be compressed effectively (eg. MPEG-2, CCIT-Group 4) by removing redundancy using adaptive "windowing" techniques. In the above example the sample V2/4 could be comprised of variable fractions (a0 . . . a9) of all 9 HD DTV lines such as

| V0/9 | V1/9 | V2/9 | V3/9 | V4/9 | V5/9 | V6/9 | V7/9 | V8/9 | V9/9 |
|------|------|------|------|------|------|------|------|------|------|
| *a0  | *a1  | *a2  | *a3  | *a4  | *a5  | *a6  | *a7  | *a8  | *a9  |

$$+ = V2/4$$

but in practice 3×3, 5×5 or 7×7 windows aka spatial filters are good enough and often are more easily implemented in real time as if spatial frequencies of the video image are separable in the horizontal and vertical direction. Note 3×3 # nearest neighbor average is in morphic resonance with 2nd derivative Laplacian operator (del-squared $\nabla V$) in the visual cortex.

For NTSC only a common GEN LOCK SYNC CHIP runs at 4 times color subcarrier such that when divided down by 455 the 2Fh is produced which produces interlace by further division by 525. Although the picture elements are not square the 768 dots per width correspond to a video bandwidth of 7.2 MHz or about twice VCR resolution.

It is often desireable to transform RGB, Y,I,Q or Y, Cb, Cr values that are interdependent, to the subjective HSV Hue, Saturation, Value color space because the HSV attributes are supposedly independent. A red and green pixel should not produce a yellow as averaging would, except when the TV color triads are deliberately less than the arc minute angular subtense defined as 20/20 vision.

The foregoing filtering effectiveness and operability is supported by the following publications: *Optimum Signal Processing* by (Prof) Sophocles Orfanidis at Rutgers SUNJ, *Discrete-Time Signal Processing* by Oppenheim & Schafer, *IEEE Special Issue on Digital Image Processing* July 1972 and most recently *Digital Television Fundamentals* by Robin & Poulin and standards mentioned above.

Thus the present invention realizes the aforenoted objectives, advantages and features, and although the preferred embodiments have been disclosed and described in detail herein, its scope should not be limited thereby but rather its scope should be determined by the appended claims.

What is claimed is:

1. An apparatus for converting high definition TV (HDTV) signals representing HD pixels defining a frame, into output signals viewable on a standard TV set, said apparatus comprising:

a processor adapted to partition said frame into arrays of HD pixels, and to assign a conventional definition (CD) pixel for each array based on values of said HD pixels; and an assembler coupled to said processor which assembles said CD pixels in a series defining said output signals wherein said processor includes a sampling pattern generator aged to generate a dither pattern for said array, said repetitive dither pattern corresponding to a dither sequence including each pixel of said arrays, and wherein said processor includes an assigning element which assigns a CD value for each of said CD pixel, said CD value corresponding to the value of one of said HD pixels in accordance with said dither pattern.

2. The apparatus of claim 1 wherein said assigning element selects the same HD pixel position in each of said arrays.

3. The apparatus of claim 1 wherein said array is an n×n array.

4. The apparatus of claim 3 wherein n is selected between 2 and 3.

5. The apparatus of claim 1 wherein said processor includes a sampling pattern generator arranged to generate a pseudorandom pattern for said arrays, said patterns corresponding to a sequence including each pixel of said arrays, and wherein said processor includes an assigning element which assigns a CD location value for each of said CD pixel said CD location value corresponding to the value of one of said HD pixels in accordance with said pattern.

6. The apparatus of claim 5 wherein said assignment element selects the same HD pixel location in all the arrays for each frame.

7. The apparatus of claim 5 wherein said assignment element does not select the same HD pixel location in all the arrays for each frame.

8. A method for converting HD signals forming HD pixels defining HD TV frames into conventional definition (CD) signals which can be viewed on a conventional TV receiver, said method comprising the steps of:

partitioning each HD frame into a plurality of arrays, each array consisting of a preselected number of HD pixels;

selecting one pixel from each array;

assembling said one pixels in the same sequence as said arrays to form said CD signals; and further comprising generating a pseudorandom sampling pattern for each array, each pattern including each pixel of the respective array at least once, wherein in said step of selecting said one pixel, said one pixel is selected based on said pseudorandom sampling pattern.

9. The method of claim 8 wherein during said step of generating said pseudorandom sampling pattern, an ordered dither pattern is generated.

10. The method of claim 8 wherein each array has a center pixel and wherein said center pixel is selected as said one pixel.

11. An apparatus for converting high definition TV (HDTV) signals representing HD pixels defining a frame, into output signal viewable on a standard TV set, said apparatus comprising:

a processor adapted to partition said frame into arrays of HD pixels, and to assign a conventional definition (CD) pixel for each array based on values of said HD pixels; and an assembler coupled to said processor which assembles said CD pixels in a series defining said output signals;

wherein said processor includes a sampling pattern generator arranged to generate a pseudorandom pattern for said arrays, said patter corresponding to a sequence including each pixel of said arrays, and wherein said processor includes an assigning element which assigns a CD location value for each of said CD pixel, said CD location value corresponding to the value of one of said HD pixels in accordace with said pattern.

* * * * *